(12) United States Patent
Richardson et al.

(10) Patent No.: US 6,297,734 B1
(45) Date of Patent: Oct. 2, 2001

(54) RANDOMIZATION OF TRANSMIT TIME

(75) Inventors: David Livingstone Richardson, Arlington Heights; Gabor Elek, Northbrook, both of IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/401,248

(22) Filed: Sep. 23, 1999

(51) Int. Cl.[7] .................................................. G08B 1/08
(52) U.S. Cl. ..................... 340/539; 340/572.1; 340/10.2
(58) Field of Search ................... 340/505, 506, 340/572.1, 572.4, 573.1, 825.06, 539, 10.2

(56) References Cited

U.S. PATENT DOCUMENTS

| | | | |
|---|---|---|---|
| 3,720,910 | 3/1973 | McLaughlin et al. | 340/18 R |
| 4,442,426 | 4/1984 | Heuschmann et al. | 340/539 |
| 4,462,022 | 7/1984 | Stolarczyk | 340/506 |
| 4,471,345 | 9/1984 | Barrett, Jr. | 340/572 |
| 4,570,265 | 2/1986 | Thro | 455/52 |
| 4,734,680 | 3/1988 | Gehman et al. | 340/539 |
| 5,430,441 | 7/1995 | Bickley et al. | 340/825.54 |
| 5,461,365 * | 10/1995 | Schlager et al. | 340/573.1 |
| 5,530,702 | 6/1996 | Palmer et al. | 370/85.3 |
| 5,640,151 | 6/1997 | Reis et al. | 340/825.54 |
| 5,644,576 | 7/1997 | Bauchot et al. | 370/437 |
| 5,673,037 | 9/1997 | Cesar et al. | 340/825 |
| 5,727,018 | 3/1998 | Wolf et al. | 375/210 |
| 5,745,037 | 4/1998 | Guthrie et al. | 340/573 |
| 5,838,718 | 11/1998 | Ichihashi | 375/202 |
| 6,222,440 * | 4/2001 | Heller | 340/825.31 |

* cited by examiner

*Primary Examiner*—Daryl Pope
(74) *Attorney, Agent, or Firm*—Terry J. Anderson; Karl J. Hoch, Jr.

(57) ABSTRACT

The present invention discloses an apparatus for randomizing the transmit time in a tag RFID communication system. The CRC calculation is implemented through the use of software stored in the system microprocessor and the calculations vary upon a plurality of dynamic inputs including temperature and motion of the tag. The tag apparatus of the present invention includes temperature and motion monitors for monitoring the environmental conditions of the tag. A microprocessor in communication with the sensor calculates the next pseudo-random transmission based upon the dynamic inputs. A transmitter transmits a signal to the system monitor.

16 Claims, 15 Drawing Sheets

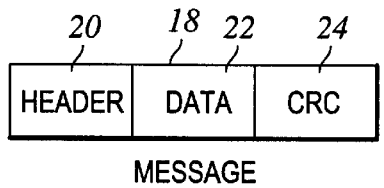
MESSAGE
Fig. 3
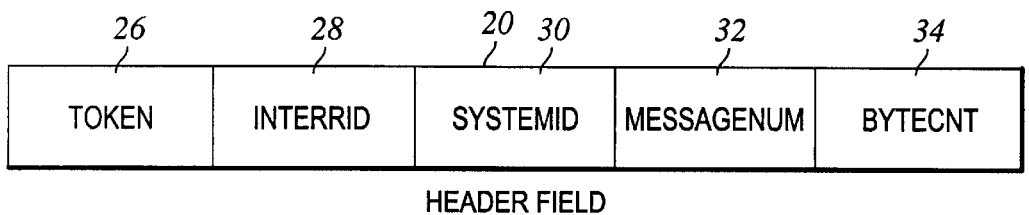
HEADER FIELD
Fig. 4
| TOKEN | 1 BYTE | 0xFF |
|---|---|---|
| INTERR ID | 8 BYTES | UNIQUELY DEFINED FOR USER SYSTEM |
| SYSTEM ID | 2 BYTES | UNIQUELY DEFINED FOR USER SYSTEM |
| MESSAGE NUM | 1 BYTE | INCREMENTED EACH TRANSMISSION FROM 0x00 TO 0xFF |
| BYTE CNT | 2 BYTES | 0x000F |
DETAILS OF THE HEADER FIELD
Fig. 5

DATA FIELD

| MFR TAG ID | 10 BYTERS | UNIQUELY DEFINED FOR USER SYSTEM |
|---|---|---|
| ALARM TYPE & MOD NUM (TEMPERATURE) | 1 BYTE | 0x02 |
| ALARM MODIFIER (TEMPERATURE) | 2 BYTES | SEE TEMPERATURE MODIFIER TABLE |
| ALARM TYPE & MOD NUM (MOTION) | 1 BYTE | 0x05 |
| ALARM MODIFIER (MOTION) | 1 BYTE | SEE MOTION MODIFIER TABLE |

DETAILS OF THE DATA FIELD

| BIT | TEMPERATURE MODIFIER |
|---|---|
| 0 LSB | TEMPRATURE BIT 0 LSB |
| 1 | TEMPERATURE BIT 1 |
| 2 | TEMPERATURE BIT 2 |
| 3 | TEMPERATURE BIT 3 |
| 4 | TEMPERATURE BIT 4 |
| 5 | TEMPERATURE BIT 5 |
| 6 | TEMPERATURE BIT 6 |
| 7 | TEMPERATURE BIT 7 |
| 8 | HIGH TEMP THRESHOLD EXCEEDED |
| 9 | LOW TEMP THRESHOLD EXCEEDED |
| 10 | RESERVED |
| 11 | RESERVED |
| 12 | RESERVED |
| 13 | RESERVED |
| 14 | RESERVED |
| 15 | RESERVED |

TEMPERATURE MODIFIER TABLE

Fig. 8

| BIT | MOTION MODIFIER |
|---|---|
| 0 LSB | MOTION PRESENT |
| 1 | START OF MOTION |
| 2 | RESERVED |
| 3 | MOTION DETECTED |
| 4 | RESERVED |
| 5 | RESERVED |
| 6 | RESERVED |
| 7 | RESERVED |

MOTION MODIFIER TABLE

Fig. 9

| TEMPERATURE | DIGITAL OUTPUT |
|---|---|
| +125°C | 01111101 |
| +25°C | 00011001 |
| 0°C | 00000000 |
| -1°C | 11111111 |
| -25°C | 11100111 |
| -55°C | 11001001 |
| ERROR OR SENSOR NOT INSTALLED | 10000000 |

TEMPERATURE READING TABLE

Fig. 10

RANDOMIZATION OF TRANSMIT TIME

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates to a tag communications system used for the electronic surveillance and tracking of articles within a defined region. In the system of the present invention, a system monitor, communicates with and tracks tags and hence the articles, which may be moved about within the region. The present invention is useful where large numbers of tags are located within the region.

Methods and communications systems for electronic surveillance and the tracking of articles within a defined region are generally known. A systems tag can be attached to a variety of objects such as parts within a warehouse, vehicles within a region, persons on a battlefield or livestock within a pasture. The monitoring device can track the objects such as inventory or stock within a warehouse, vehicle or personal location, or for other purposes necessary for locating and tracking articles.

Simple systems for tracking articles within a region may include labels affixed to the articles and bar code readers. In such a system, bar code readers can be physically brought to the tag, or the articles with the bar codes can be passed near a bar code reader. Such systems have major limitations such as locating the article once it has been warehoused. Furthermore, such a simple system would not be practical for use on a large volume of articles to be sampled.

Thus, there is a great need in the art for an efficient, low-cost accurate system that allows a central monitoring unit to communicate with tags attached to a large number of articles within a defined region. Due to the great number of articles involved, the system must be capable of remotely communicating with the tag to identify information such as location.

Systems have been developed for the remote monitoring of a plurality of tags through the use of radio frequency (RF) identification. One such system is a magnetic coupling system wherein a tag passes through a magnetic field in order to alert the monitoring system of the articles of passage through the region. A common use of such a system is the use of tags on retail merchandise which activates an alarm if a customer attempts to remove the article from the premises.

Other types of RF systems include a reflective tag which reflects the monitor's RF radiation to a receiver to identify the article. Such systems are deficient as they do not include on-board power sources. The reflective signals are inherently weak and may be limited to short range usage.

To increase the range of such RF systems, tags employ on-board power systems to allow active communication between an interrogator and a plurality of tags within the region. In such a system, an interrogator sends out a signal to a particular tag identifying the location of the tag. Such systems are not practical where a large number of articles are within the region. Furthermore, such systems may not be practical as items may remain stationary within a region for long periods of time, and it is inefficient and costly for the interrogator to attempt to communicate with tags which have not changed location.

Other RF systems include a transmit-only radio frequency identification (RFID) system. In an RFID system, the tags periodically communicate with a monitor to announce location. Such systems are not practical with large numbers of tags, as each tag would be assigned a unique time slot, and it would be time consuming and inefficient for each of the tags to communicate. Furthermore, such RFID system would only be updated for the length of the cycle time, and information may be delayed or inaccurate.

Other transmit-only RFID systems include a plurality of tags which speak to the monitor upon movement or some other event which causes the tag to send a signal. Such a system has inherent limitations as the tag cannot monitor the RF environment to see if the RF channel is clear prior to transmitting a tag signal and also, the system must operate with hundreds of tags while sharing the same RF frequency which creates an overlapping signals and creates data error.

Other systems offer an attempt to address some of the limitations of transmit-only RFID systems. Some RF transmit-only RFID systems include an on-board random signal generation circuit to prompt random transmissions to the central monitoring station. Although the randomization aids in reducing undesirable overlapping, a unacceptable amount of such overlap occurs. Randomization of the transmit time by the tag is calculated through a hardware module located within the tag. In this regard, the transmit times are random and are not influenced by outside environmental factors.

Accordingly, there is a substantial need in the art for an efficient tag monitoring system wherein the system operates with a large number of tags within a defined region and where the transmit time of the tags is calculated in a pseudo-random manner wherein outside environmental factors which are indicative of movement of the tag also contribute to the transmit time, and this reduces undesirable overlapping of signals.

BRIEF SUMMARY OF THE INVENTION

The present invention discloses an apparatus for randomization of the transmit time in a tag RFID communication system. The system is useful in tracking a plurality of articles within a defined area. The random generator of the signal is a pseudo-random signal produced by a CRC calculation derived from sensors which monitor the tag environment.

The present invention addresses problems associated with transmit-only RFID systems. The present invention provides a reliable method of randomizing transmit times of the tags to minimize overlapping signals, and to reduce data errors. The present invention initially includes a method of randomizing the transmit time, reduces the overlapping of RF signals, improves system throughput, and enables multiple access in the system. The probability of randomness is greater as the random transmission is based upon a freshly calculated CRC.

The method of the present invention is utilized for producing a pseudo-random RF signal for use in a multiple tag monitoring system. The method comprises the steps of monitoring the environmental conditions of the tag which may include the monitoring of the temperature and motion of the tag. The tag may monitor additional environmental conditions such as pressure, humidity, types of chemicals, light intensity, electric field strength, acoustic sound, and geo-location, to increase its awareness of the immediate vicinity. Based upon the monitored information, the method calculates a pseudo-random transmit time, and the signal is produced.

The apparatus of the present invention includes a microprocessor for receiving data from at least one sensor from monitoring the environmental conditions of the tag. The monitors may gauge the temperature or motion of the tag. The tag additionally includes a transmitter for transmitting a signal at the calculated pseudo-random transmit time. Said tag may additionally include a timing circuit for aiding in the transmission of the signal. The components of the tag are powered by an on-board power source.

It should be noted and understood that with respect to the embodiments of the present invention, the materials suggested may be modified or substituted to achieve the general overall resultant high efficiency. The substitution of materials or dimensions remain within the spirit and scope of the present invention.

BRIEF DESCRIPTION OF THE SEVERAL VIEWS OF THE DRAWING

FIG. 3 is a graphical representation of the message field of the present invention;

FIG. 4 is a graphical representation of the header field of the present invention;

FIG. 5 is a table showing the details of the header field of the present invention;

FIG. 8 is a table representing temperature modifier information of the present invention;

FIG. 9 is a table showing a motion modifier information of the present invention;

FIG. 10 is a temperature reading table;

DETAILED DESCRIPTION OF THE INVENTION

The detailed description as set forth below in connection with the appended drawings is intended as a description of the presently preferred embodiments of the present invention, and are not intended to represent the only form in which the present invention may be constructed or utilized. The description sets forth functions and sequence of steps for constructing and operating the invention in connection with the illustrated embodiments. It is understood, however, the same or equivalent functions and sequences may be accomplished by different embodiments and that they are also intended to be encompassed within the spirit and scope of this invention.

Portions of this patent document may contain material which is subject to copyright protection. The owner of the copyright reserves all copyrights in the disclosure, however, the copyright owner has no objection to facsimile reproduction of the patent document or the patent disclosure, as it appears in the Patent Office file or records.

Figure 1:
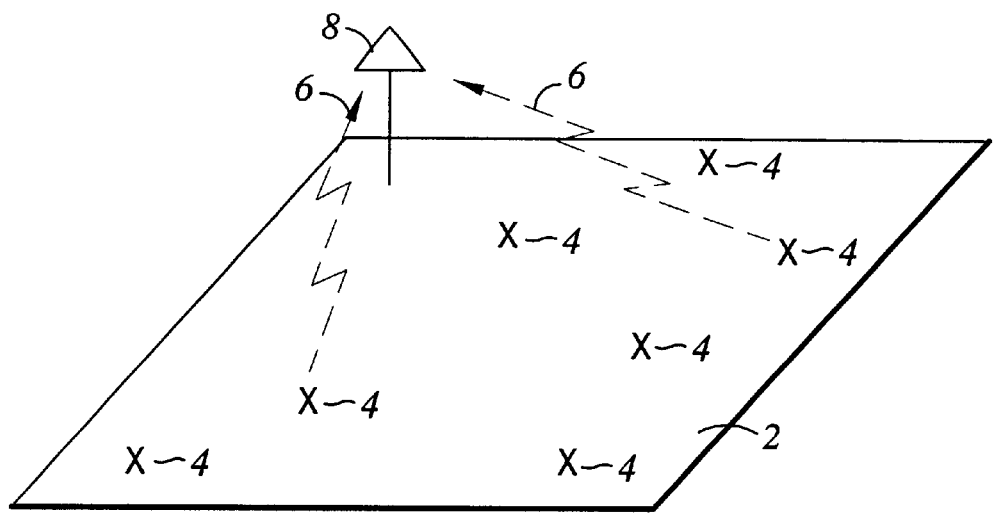
FIG. 1 depicts a radio frequency monitor defining a communications region including a plurality of tags.

The present invention discloses an apparatus for randomizing the transmit time in a tag RFID communications system. Referring to FIG. 1, the system is useful in tracking a plurality of articles within a defined Area 2. The system utilizes a plurality of transmit-only tags 4 in the RFID application. The tags 4 randomly transmit signals 6 to a system monitor 8. The random generator of a signal 6 is a pseudo-random signal produced by a CRC calculation derived from sensors which monitor the tag 4 environment.

The present invention addresses two problems associated with transmit-only RFID systems. Firstly, the present invention provides a reliable method of randomizing transmit times of the tags 4 to minimize the overlapping signals and to reduce data errors as the tags cannot monitor the RF environment to see if an RF channel is clear prior to transmitting the tag signal 6. Second, transmit-only RFID systems operate with hundreds of tags 4 sharing the same RF frequency, and accordingly, the method of randomizing the transmit times reduces the problems associated with the overlapping of RF signals. In this regard, the present invention improves system throughput and enables multiple access in the system.

The present invention is a significant improvement over the prior art as the probability of randomness is much greater and the probability of overlapping therefore reduced due to the fact that every transmission is based upon a freshly calculated CRC. In transmit only RFID systems, the RF tag 4 is always the talker and the monitor 8 is always the listener. Accordingly, a large number of tags 4 speak to a monitor 8 at randomly generated times. The randomness diminishes the possibility of overlap of RF signals as they share a common channel. In prior art devices, the calculation of a CRC is accomplished through a hardware implemented pseudo-random binary sequence reply counter.

In the present invention, the CRC calculation is implemented through use of software stored in the system microprocessor, and the calculations vary based upon a plurality of dynamic inputs. In this regard, because the dynamic inputs of the transmission of the CRC get recalculated before each transmission, this constant recalculation of the CRC provides a dynamically reconfigured randomization of the transmit time. More specifically, the random number chosen to calculate the CRC depends on a reading of a temperature sensor and motion sensor in the tag, so that the CRC changes dynamically during tag operation.

Figure 2:
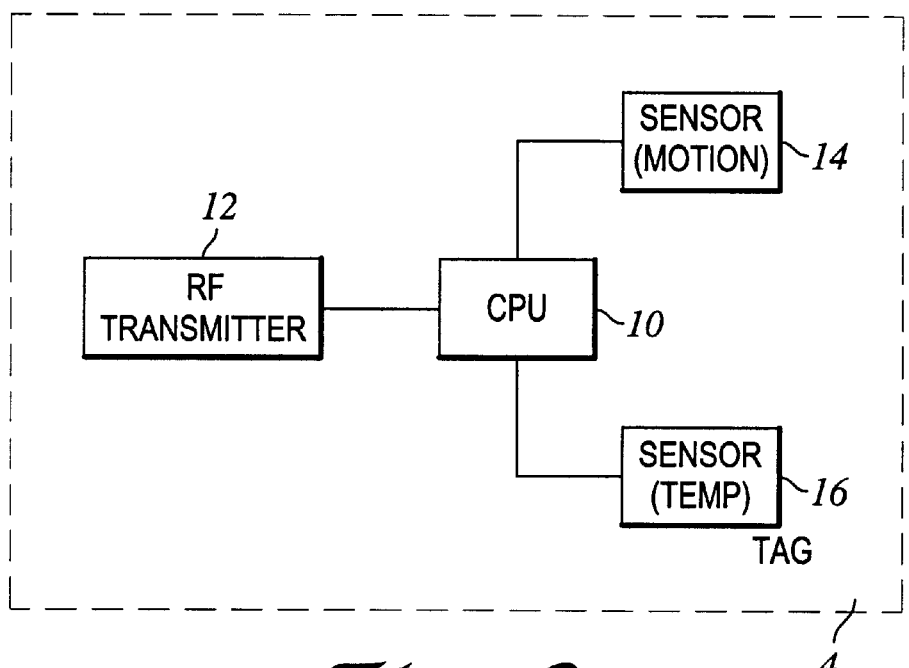
FIG. 2 depicts a block diagram of the tag of the present invention.

Referring specifically to FIG. 2, shown is a schematic diagram of the components of the tag 4. The tag 4 includes a power source (not shown) which allows the tag to effectively monitor its environment and transmit a signal under certain conditions. The tag includes a microprocessor 10, which provides instruction to the radio frequency transmitter 12.

In the preferred embodiment of the present invention, the tag 4 monitors the environmental conditions of the tag through a motion sensor 14 and a temperature sensor 16. The sensor information from sensors 14 and 16 are communicated to the microprocessor 10. The microprocessor 10 calculates a pseudo-random transmit time based upon the monitored environmental conditions.

The transmitted message 18 from the RF transmitter 12 is constructed according to the Data Link Layer of the Open Systems Interconnection model for telecommunications system, as shown in FIG. 3, and is divided into the following fields: Header 20, Data 22 and CRC 24.

The Header 20 is divided into the following fields, as shown in FIG. 4 as follows: Token 26, InterrID 28, SystemID 30, MessageNum 32, and ByteCnt 34. The ByteCnt 34 is the number of bytes in the Data field 22 and excludes the number of bytes in the CRC. One byte equals eight bits. FIG. 5 shows the details of the Header field 20.

Figures 6, 7:
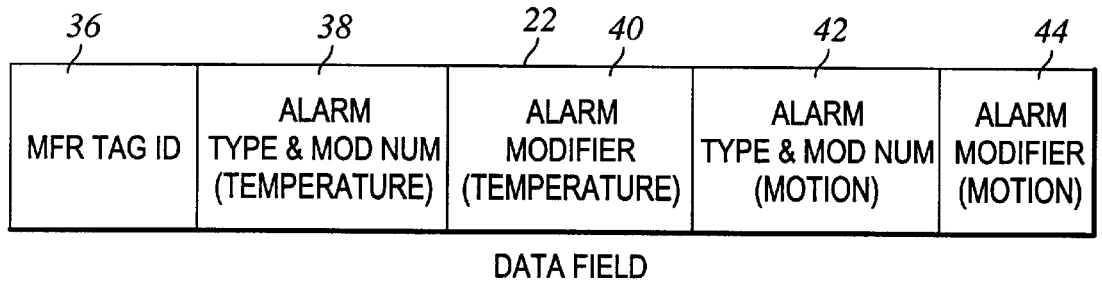
FIG. 6 is a graphical representation of the data field of the present invention.
FIG. 7 is a table showing the details of the data field of the present invention.
Figure 11:
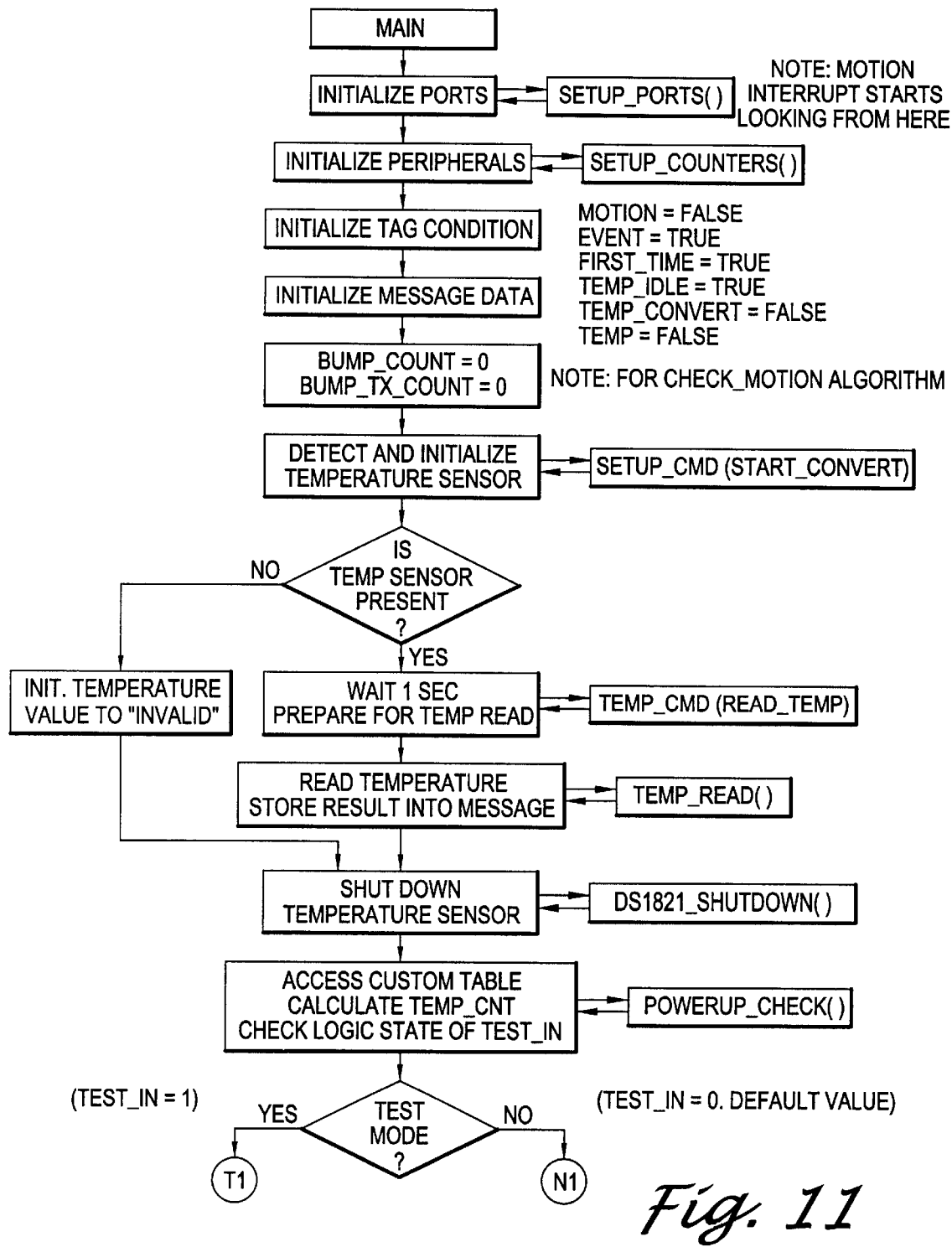
FIG. 11 is a flow chart diagram of the software component of the present invention.
Figure 12:
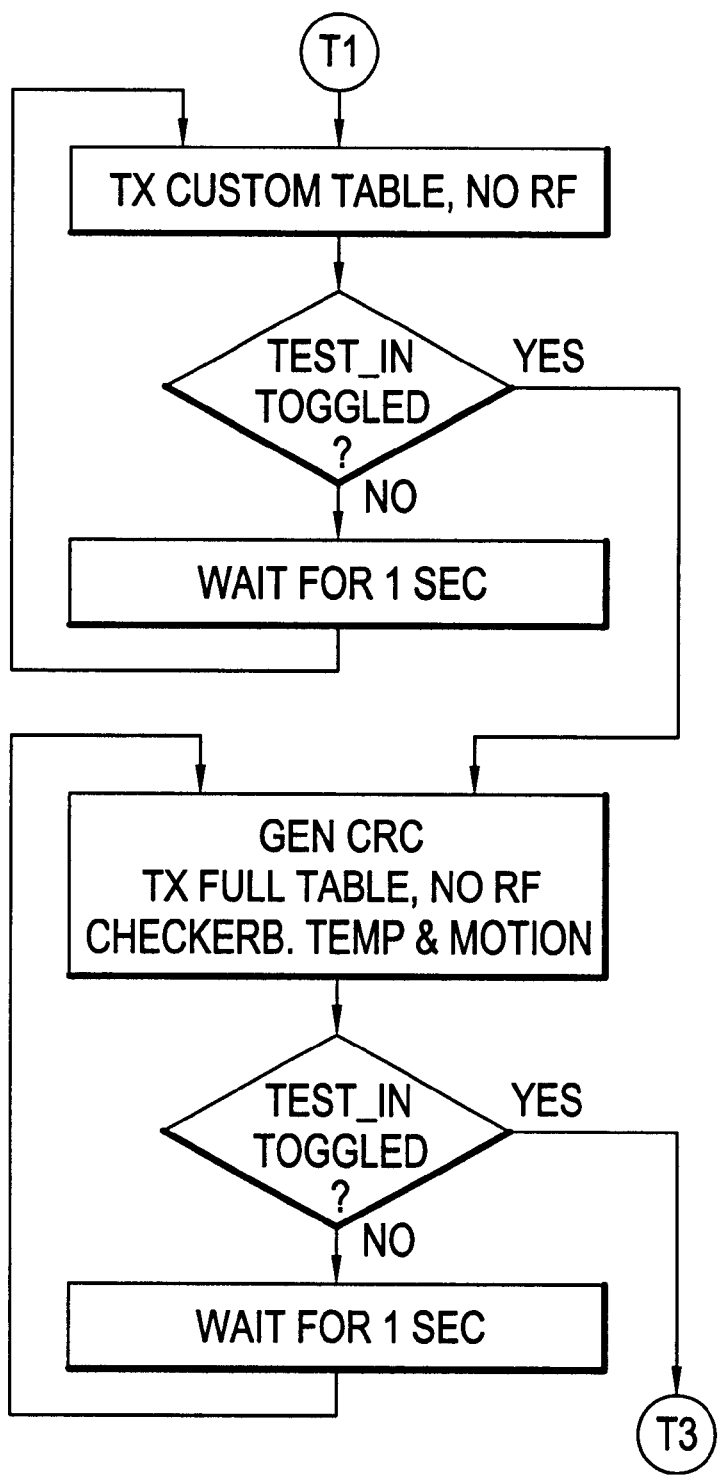
FIG. 12 is a flow chart diagram of the software component of the present invention.
Figure 13:
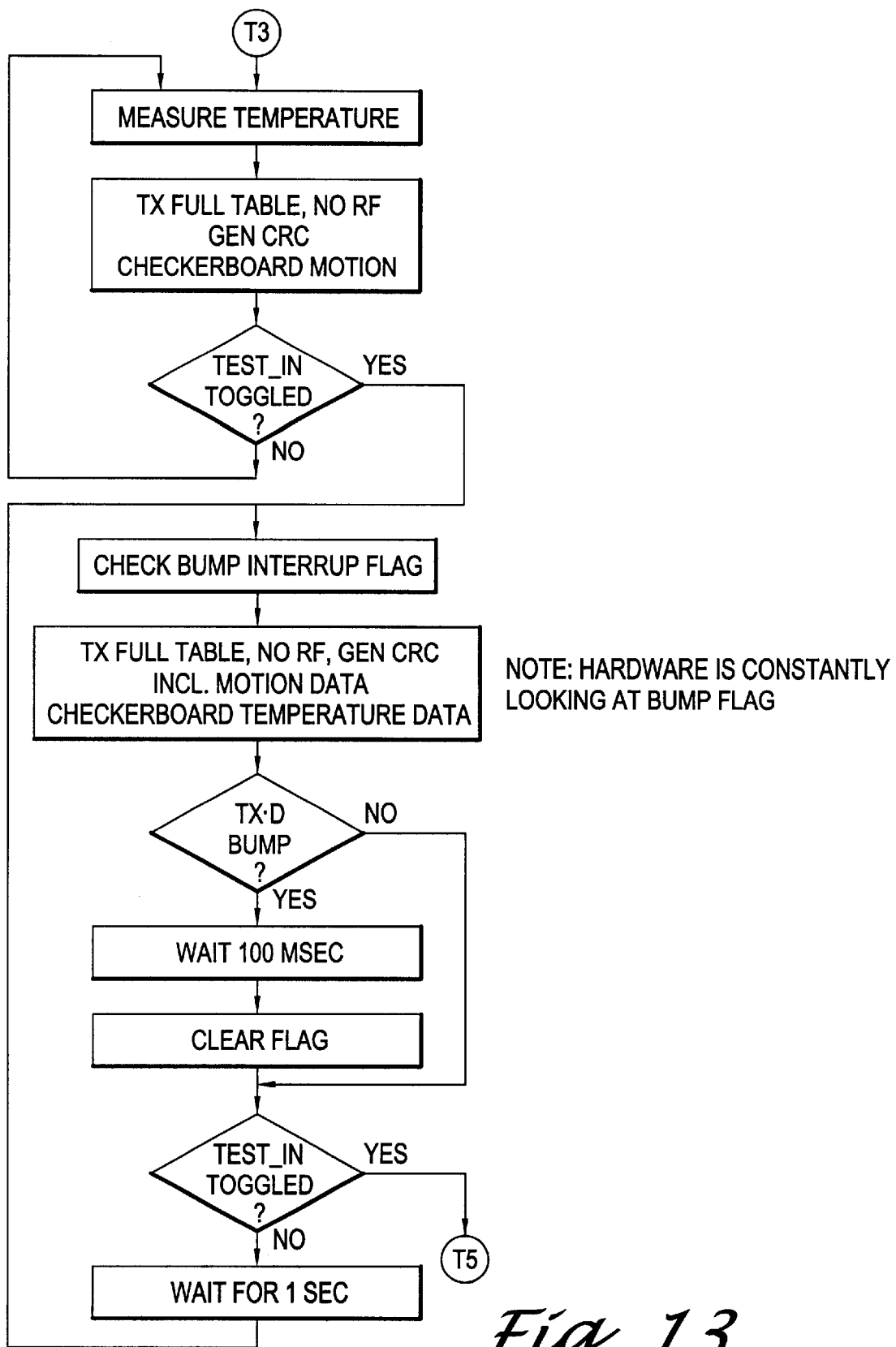
FIG. 13 is a flow chart diagram of the software component of the present invention.
Figure 14:
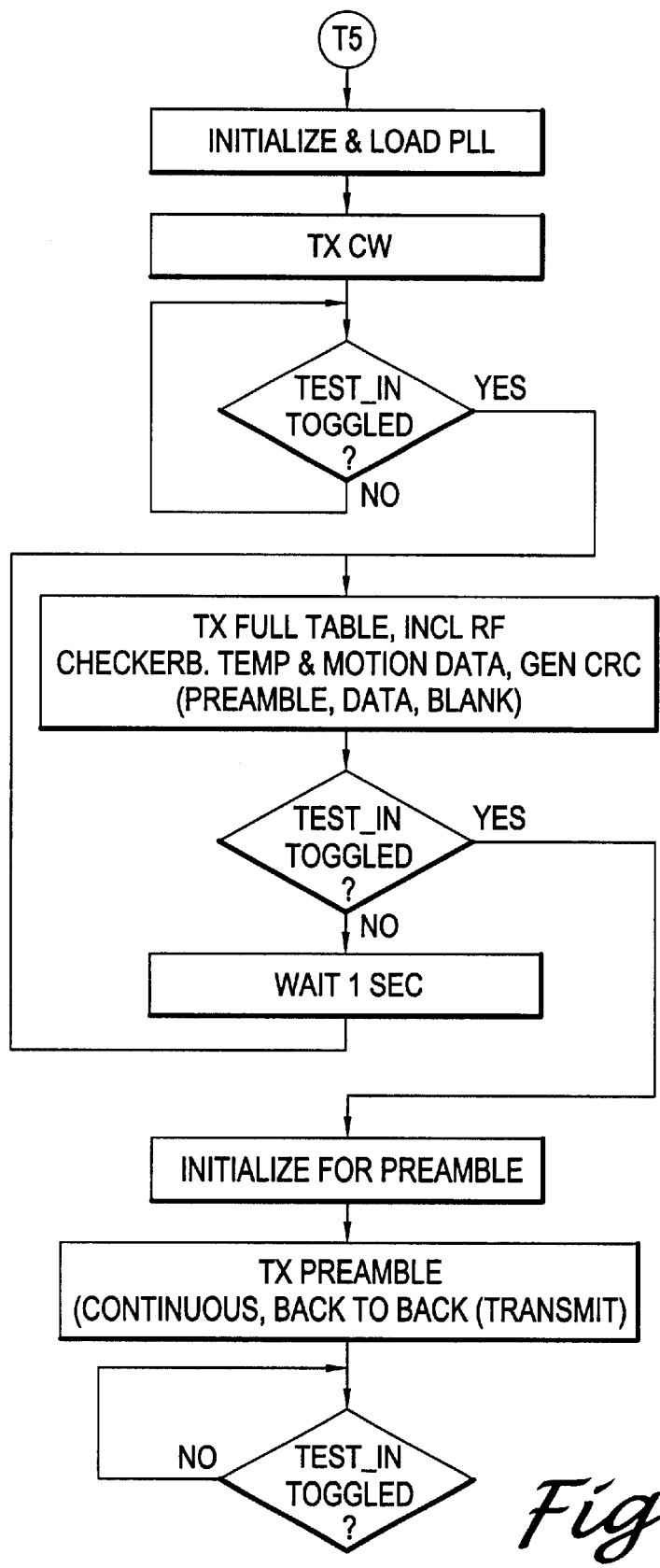
FIG. 14 is a flow chart diagram of the software component of the present invention.
Figure 15:
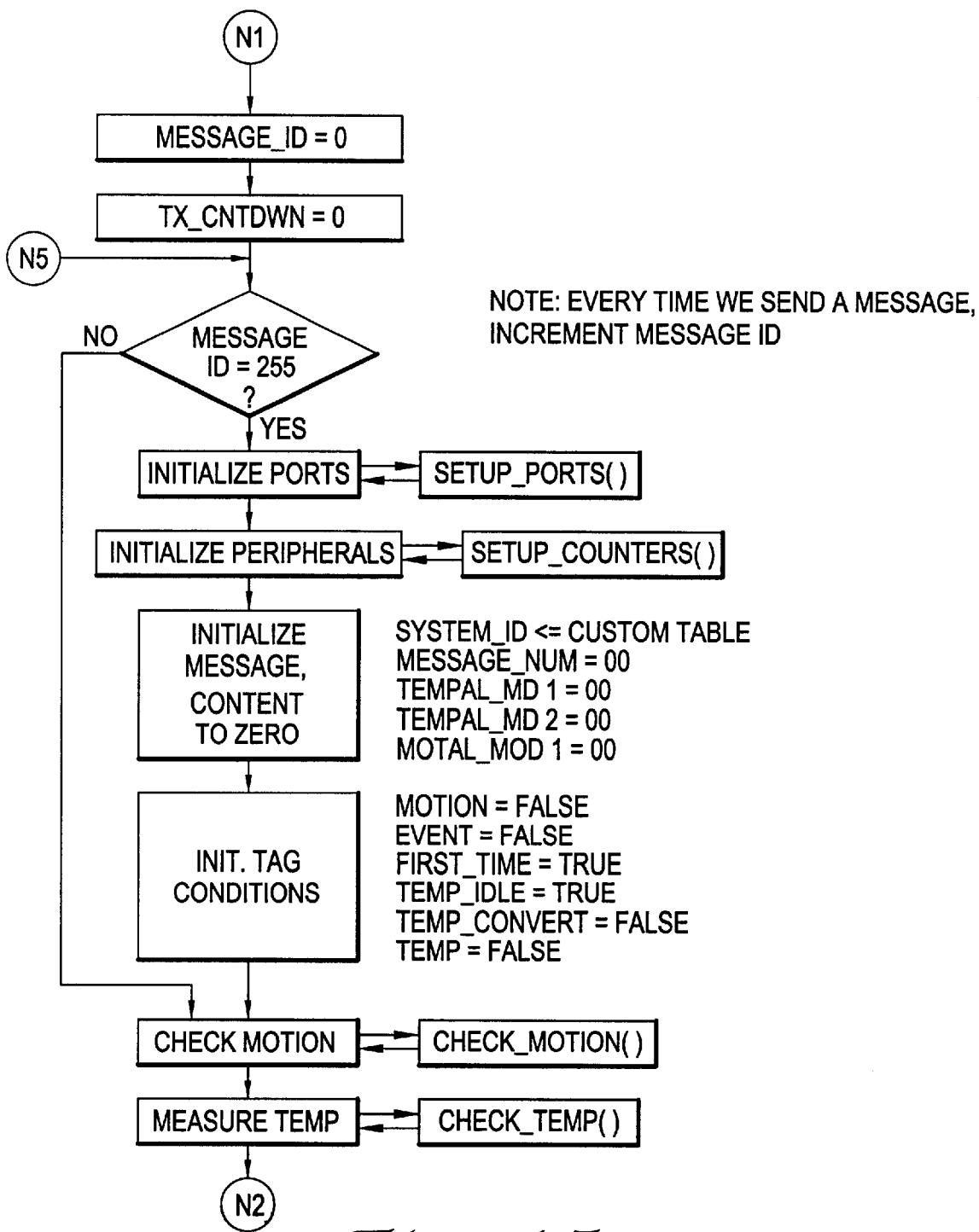
FIG. 15 is a flow chart diagram of the software component of the present invention.
Figure 16:
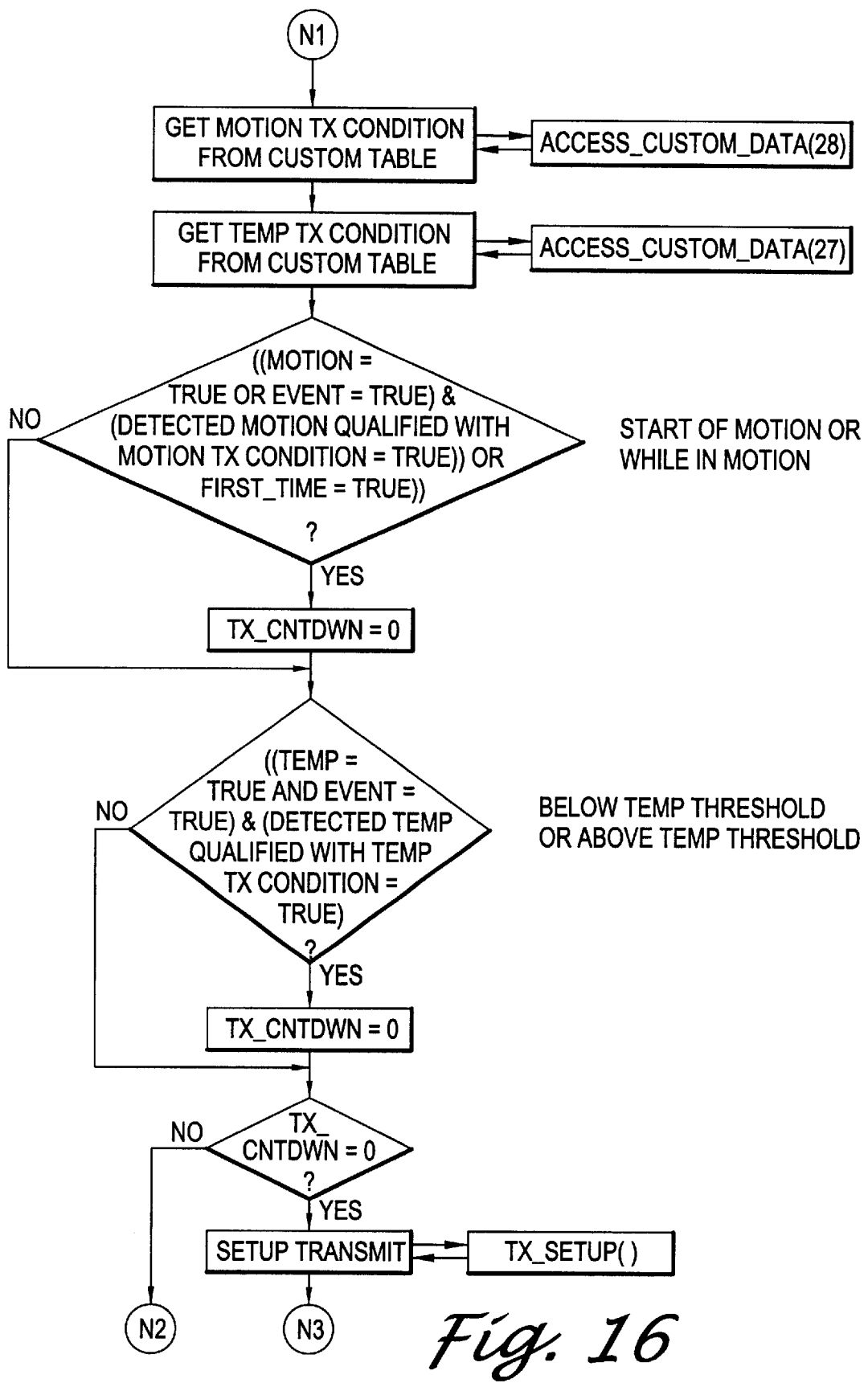
FIG. 16 is a flow chart diagram of the software component of the present invention.
Figure 17:
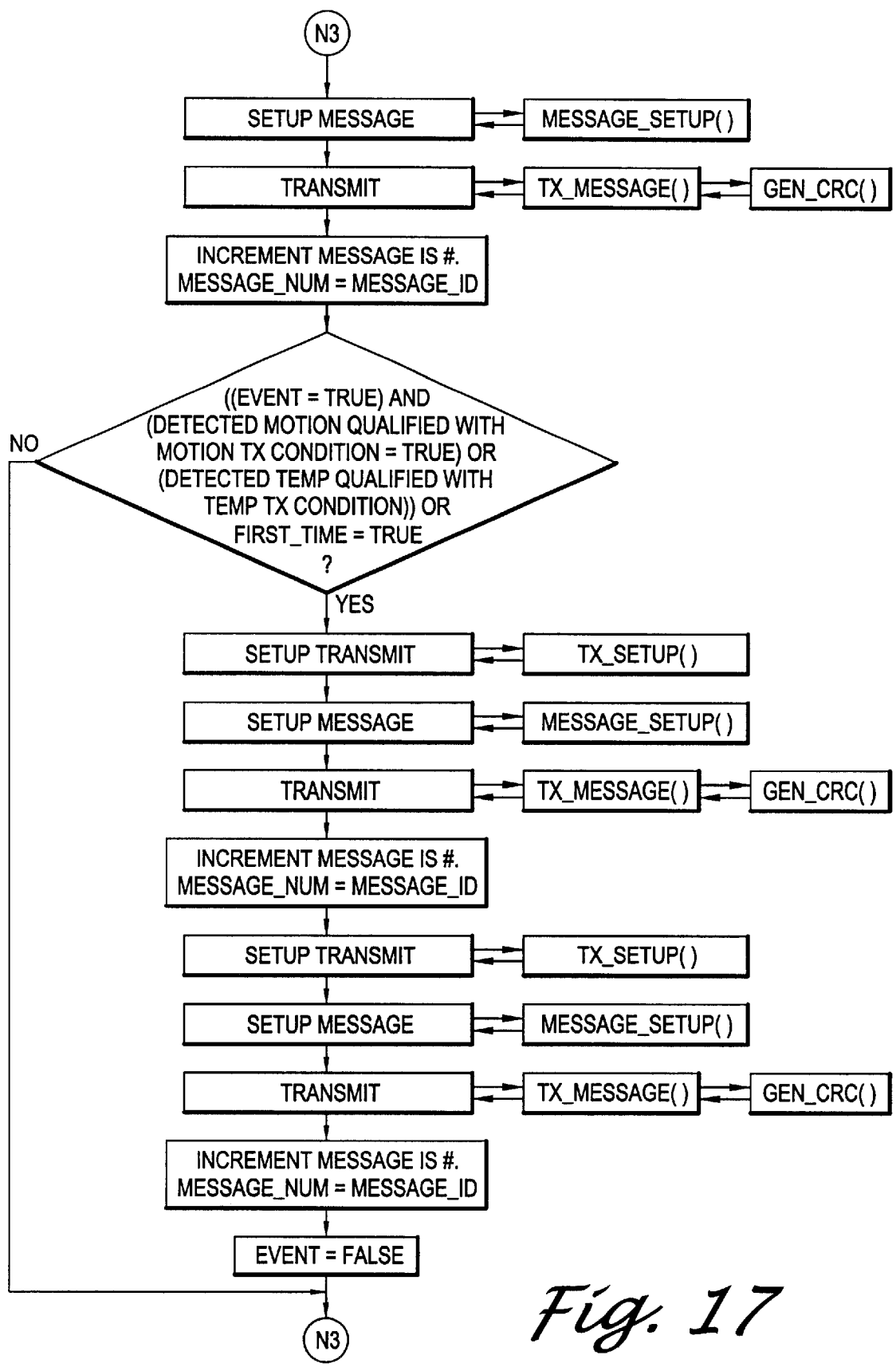
FIG. 17 is a flow chart diagram of the software component of the present invention.
Figure 18:
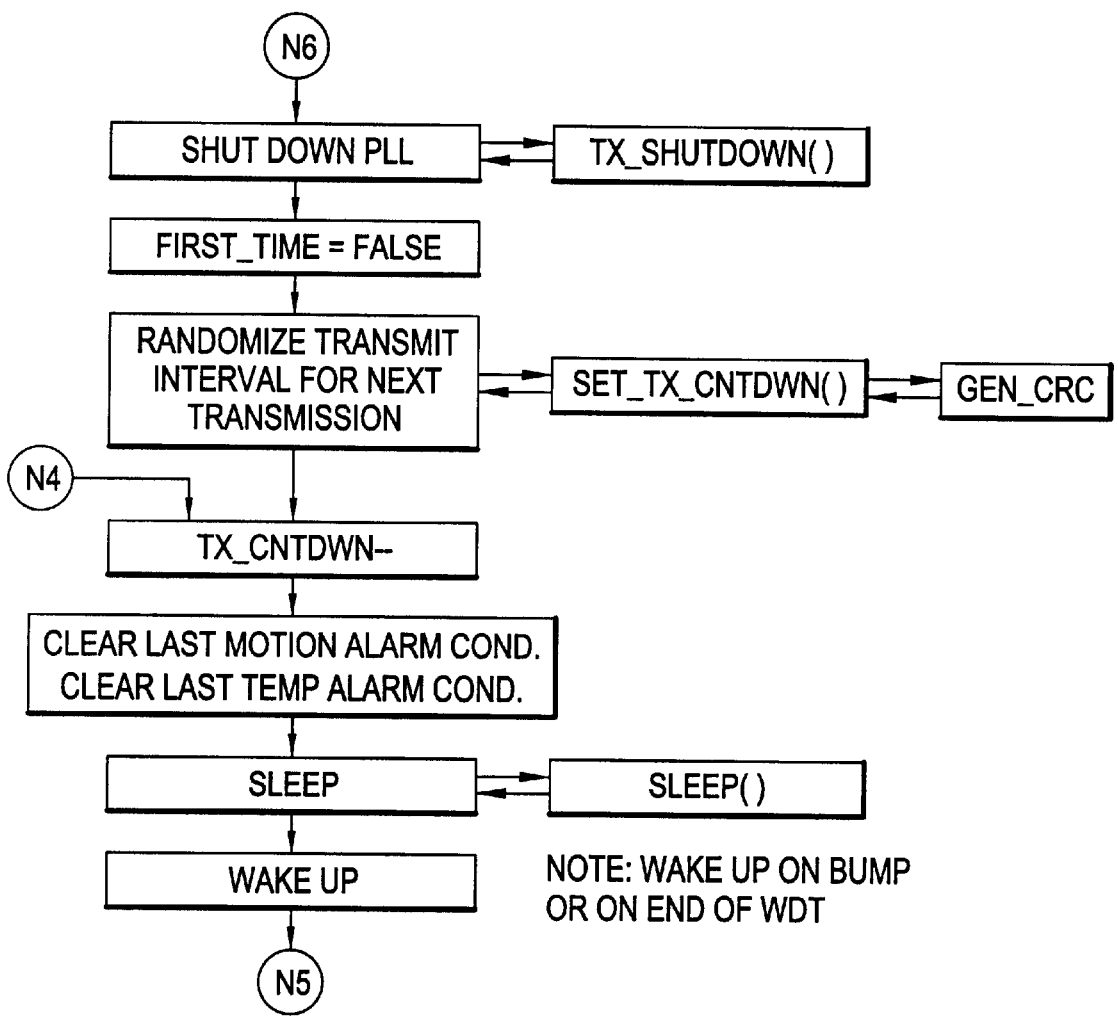
FIG. 18 is a flow chart diagram of the software component of the present invention.
Figure 19:
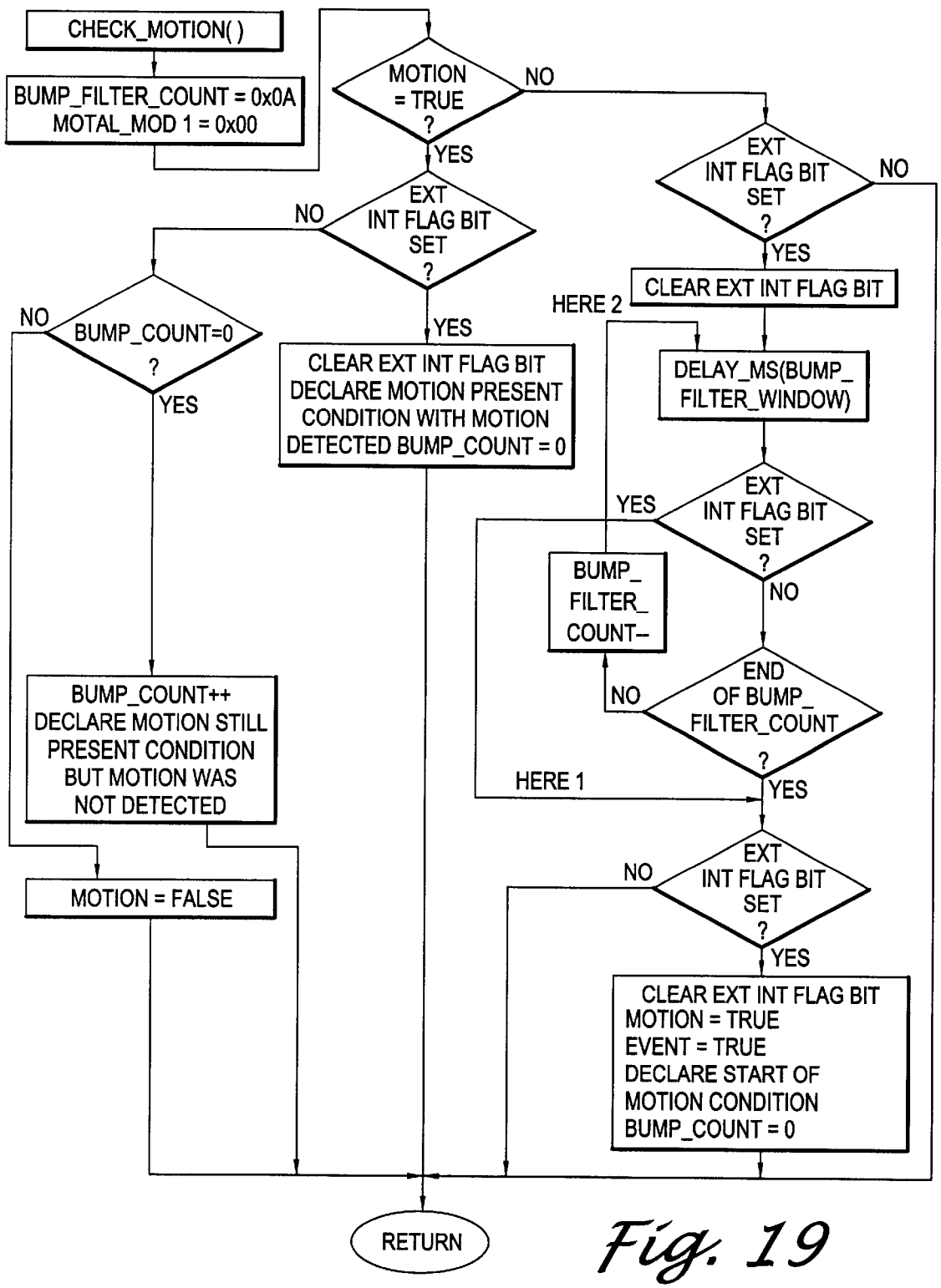
FIG. 19 is a flow chart diagram of the software component of the present invention.

The Data field 22 in FIG. 6 is divided into the following fields: MfrTagID 36 and two Alarm fields 38, 40 and 42, 44. The first Alarm field 38, 40 is temperature and the second Alarm field 42, 44 is motion. The Alarm field also consists of Alarm Type&ModNum 38, 42 and Alarm Modifier 40, 44. The details of the Data field are shown in FIG. 7.

FIG. 8 represents the Temperature modifier table and FIG. 9 represents Motion modifier table. The temperature bits 0–7 in the Alarm Modifier (Temperature) are described in the temperature reading table, as shown in FIG. 10. The CRC field 24 of FIG. 3 is a Cyclic Redundancy Check and is 2 bytes. It is computed on the Data 22 and Header 20 fields and uses the CCITT CRC-16 polynomial with a feedback value of 0x8408.

The user defined fields, such as the regular TX Interval (not shown), SystemID 30, InterrID 28, and MfrTagID 36, are defined at the point of manufacture and are stored in the tag's 4 non-volatile programmable read-only memory (PROM). The regular TX Interval is the average time between transmissions and is ten bytes from 0x0001 to 0x03FF, and its least significant bit (LSB) is one minute. The regular TX interval is not transmitted in a field in the message of FIG. 3, however, it is a time attribute of the message 18. SystemID 30 is a system level identifier and may be different with each tag, depending on the application, and is two bytes from 0x0000 to 0xFFFF. InterrID 28 is an application specific identifier, and may be different with each tag, depending upon application, and is 8 bytes from 0x0000000000000000 to 0xFFFFFFFFFFFFFFFF. MfrTagID 36 is the unique serial number of the tag and is 10 bytes from 0x00000000000000000000 to 0xFFFFFFFFFFFFFFFFFFFF.

The fixed fields are defined constants and are stored in the tag's non-volatile PROM memory, and include Token 26, ByteCnt 34, Alarm Type & ModNum (temperature) 38, and Alarm Type & ModNum (motion) 42.

The dynamic fields are fields that change based upon operating conditions in or about the environment of the tag 4 and are stored in the tag's volatile RAM memory, and include MessageNum 32, Alarm Modifier (temperature) 40, Alarm Modifier (motion) 44. MessageNum 32 increases by 1 with each transmission and after it reaches 0xFF it rolls over to 0x00 and continues counting. Alarm Modifier (temperature) 40 is based upon a reading of the temperature sensor 16. Alarm Modifier (motion) 44 is based upon the reading of a motion sensor 14.

The tag 4 contains an internal timer that counts down from the number NEXTX and tag 4 transmits the message when the timer reaches 0. After the transmission, the timer is set to a new value of NEXTX and the process is repeated. The units of NEXTX are 2.3 sec., i.e., the timer has a least significant bit of 2.3 sec. An example of such a timer is the watchdog timer in commercial production IC PIC16LC558 from Microchip.

The following describes the process of randomizing the transmit time using the message's CRC 24 and dynamic fields. After the tag 4 calculates the CRC 24 for the current message, the lower five bits from the CRC are copied to a variable called COUNT. The tag computes NEXTTX by:

NEXTTX=(Regular TX Interval)*(0x0B+COUNT)

The amount of time in seconds of the result is NEXTTX * 2.3. Therefore, we see that NEXTTX is proportional to the time to the next transmission.

The above process can be found in appendix 1 as the application source code in C. The terminology used in appendix 1 is slightly different than described above and is identified as follows: NEXTTX is referred to as "tx_cntdwn" in the source code of appendix 1; Regular TX Interval is shown as "txinterval" in the source code of appendix 1; COUNT is shown as "count" in the source code of appendix 1; 0x0B is shown on 0x000B in the source code of appendix 1.

The value of NEXTTX and therefore the time between tag transmissions change constantly because the value in MessageNum 32 changes each time that the tag computes the CRC 24. Also, the Alarm Modifier 40 (Temperature) and Alarm Modifier 44 (Motion) may change each time in the CRC 24 computation, depending on the state of the sensors in the application. Since the inputs to the CRC 24 are different each time and due to well known mathematical properties of the CRC 24 polynomial and to maximal length sequences in general, the output computation of the present CRC will be randomly different from the previous CRC 24 computation, up to the point that the timing interval is repeated due to the finite length of the input fields. Therefore, the CRC will change in a pseudo-random way. Pseudo-random means the number sequence is random to a given point and after the point it repeats with the original random pattern.

The five bits in the CRC 24 provides a pseudo-random variation in the transmit interval of 42% to 162% of Regular TX Interval. The repeat time of the pseudo-random variation is bounded by the formula:

(Regular TX Interval)*(MessageNum)*(number of temperature states)*(number of motion states)

In a typical application the boundary is (1 minute)*(256) *(1024)*(4)=1048576 minutes, or nearly 2 years. This repeat time is more than adequate for the tag application.

In practice, the cross-correlation is a limiting factor on the randomization of tag transmissions, where cross-correlation is the measure of similarity between two sequences. This means the timing sequences between two tags may overlap during a short period even though their long term sequences are different.

An overlap means that the tag transmissions may cause interference. The amount of interference that a receiver may observe from the tag transmissions depends of the message duration, modulation type, number of tags involved, frequency channelization, location of the receiver, and cross-correlation of transmit intervals. These conditions are not specified herein and so the amount of interference is not specified here.

The randomization of the process of the present invention is completed by a software component stored within the microprocessor 10 of the present invention. The code is designed for a microchip PIC 16LC558, which is a 8-bit microprocessor, however, can be translated to other microprocessors. While the key component of the code is randomization, the total code performs a multitude of functions. A software flow diagram is shown in FIGS. 11–21. The randomization component of the code is found particularly in FIG. 18. The application source code in C are shown in appendix 1. The steps for randomization are shown in the application source code on pages 13 and 14 of the appendix.

The code, which performs the randomization, and other tasks is shown in the flow diagram of FIGS. 11–21. The source code is shown in Appendix 1. The entire code performs the total functions of: (1) initializing the microprocessor; (2) reading the customization table such as serial number, RF frequency, and thresholds for the sensors (the customization table is stored in a non-volatile memory); (3) check to see if the unit is in test mode, and if so, execute the appropriate test; (4) read the state of the motion and temperature sensors and compare the states to the thresholds; (5) put the data in the message format; (6) transmit the message; (7) prepare the next transmission, and perform randomization; and (8) sleep until the next transmission.

Figure 20:
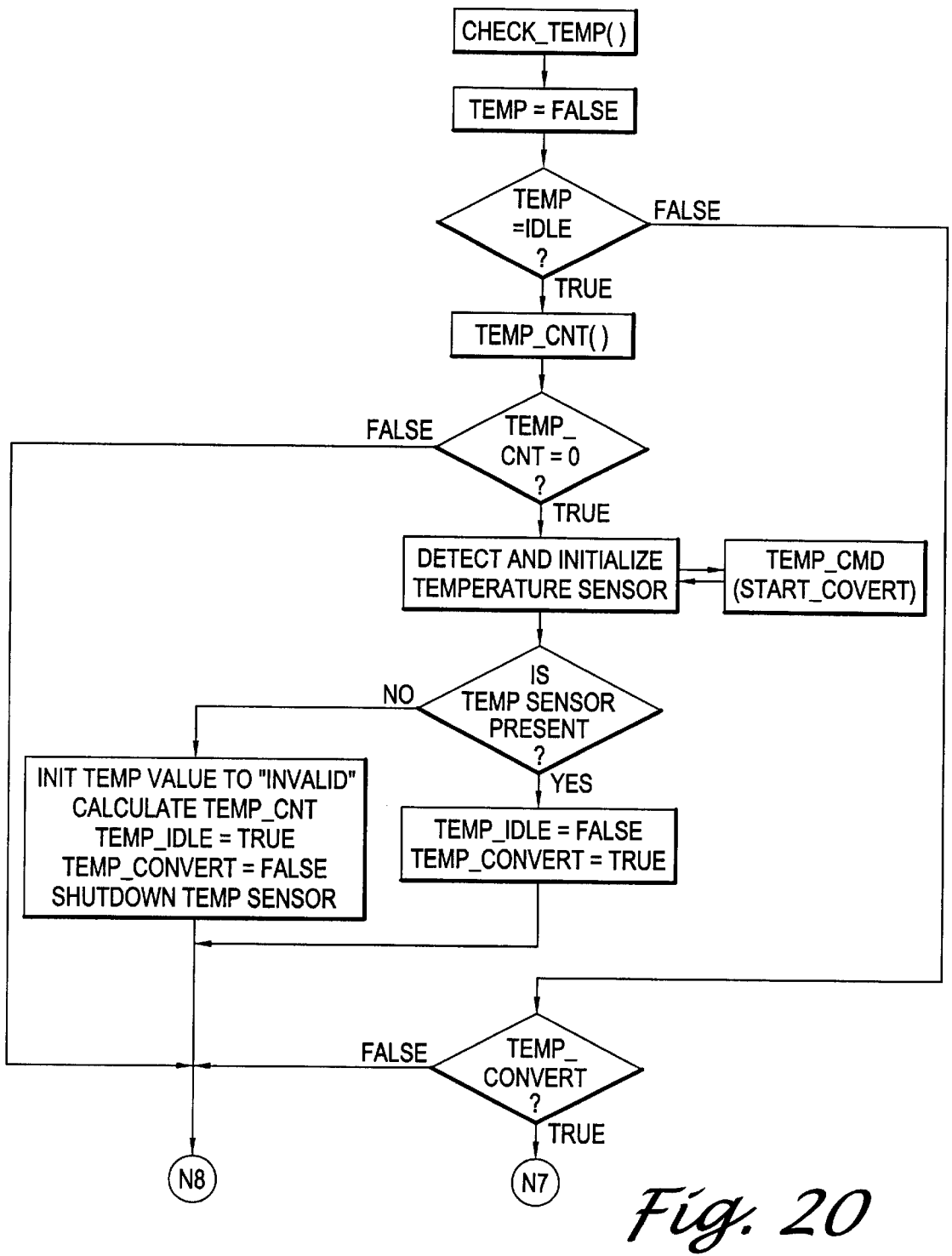
FIG. 20 is a flow chart diagram of the software component of the present invention.
Figure 21:
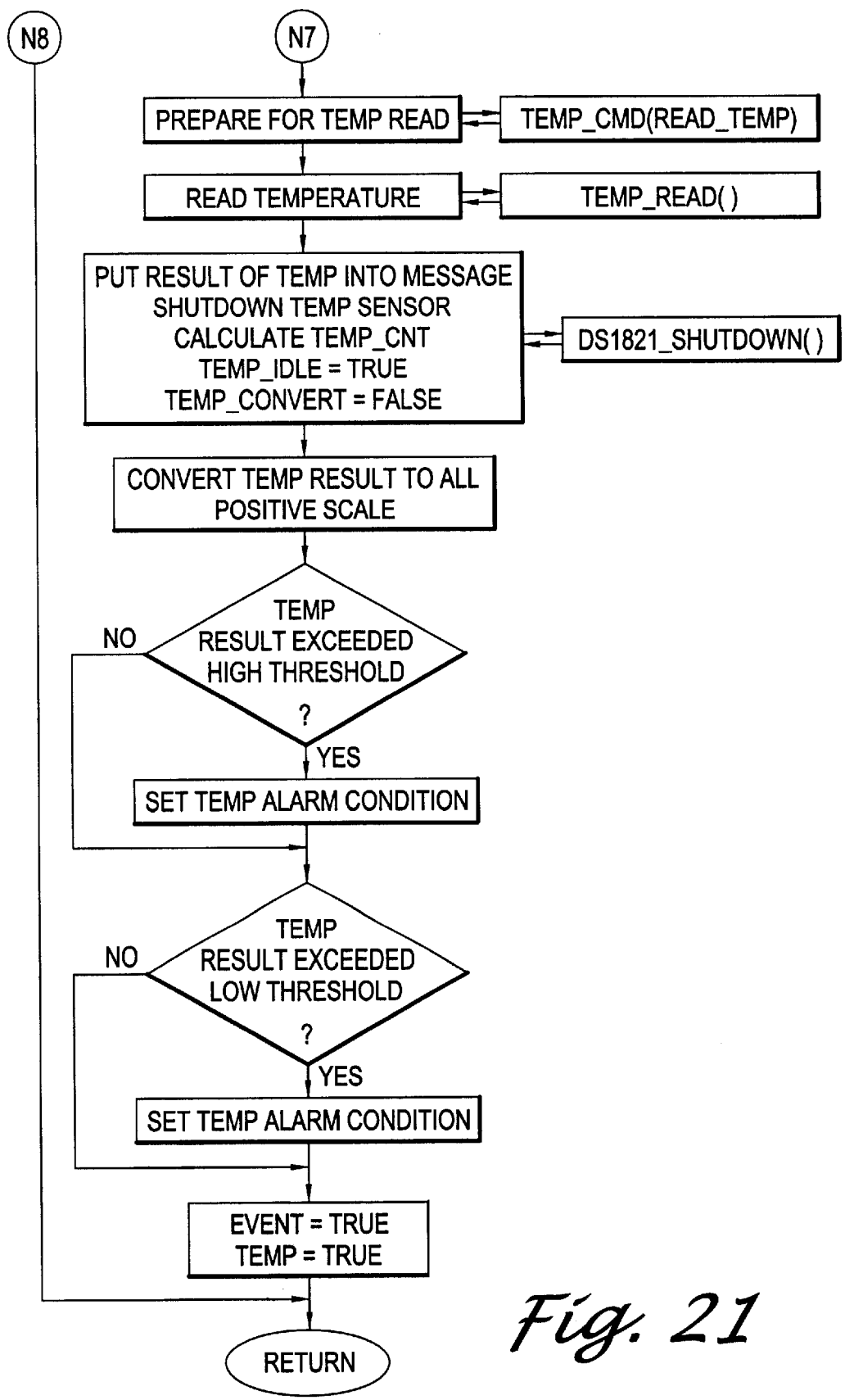
FIG. 21 is a flow chart diagram of the software component of the present invention.

Referencing specifically the flow diagram shown in FIGS. 11–21. The general characteristics of the process include the following: initialization (FIG. 11); built-in tests (FIGS. 12–14); prepare for data transmission (FIGS. 15–16); transmit message (FIG. 17); randomize next message time; begin sleep; wake up from sleep (FIG. 18); a specific routine for motion sensing (FIG. 19); and a specific routine for temperature sensing (FIGS. 20–21).

Additional modifications and improvements of the present invention may also be apparent to those skilled in the art. Thus, a particular combination of parts described and illustrated herein is intended to represent only certain embodiments of the present invention, and is not intended to serve as limitations of alternative devices within the spirit and scope of the invention.

What is claimed is:

1. A method of producing a psuedo-random RF signal in a tag for use in a multiple tag monitoring system, each of said tags including at least one on-board environmental sensor, an on-board psuedo-random transmit time calculation circuit and an on-board RF-transmitter, said method comprising the steps of:
   a) monitoring environmental conditions of a tag through the on-board sensor;
   b) calculating a psuedo-random transmit time based upon monitored environmental conditions through the on-board calculation circuit; and
   c) transmitting a signal at the calculated psuedo-random transmit time through the on-board RF transmitter.

2. The method of producing a pseudo-random RF signal of claim 1 further comprising the step of repeating the steps a–c continuously.

3. The method of producing a pseudo-random RF signal of claim 1 wherein the step of monitoring the environmental conditions of the tag includes the monitoring of the tag temperature.

4. The method of producing a pseudo-random RF signal of claim 1 outlining the step of monitoring the environmental conditions of the tag includes the monitoring of the tag motion.

5. A method for producing a psuedo-random RF signal in a tag for use in a multiple tag monitoring system, each of said tags including an on-board psuedo-random transmit time calculation circuit and an on-board data storage memory, said method comprising the steps of:
   a) calculating a psuedo-random transmit time through an on-board calculation circuit based upon the following:
      i) data stored in the on-board memory as user defined fields;
      ii) data stored in the on-board memory as fixed fields; and
      iii) data stored in the on-board memory as dynamic fields.

6. The method for producing a pseudo-random RF signal of claim 5 further comprising repeating the steps of claim 5 continuously.

7. The method for producing a pseudo-random RF signal of claim 5 wherein the dynamic field includes data indicating monitored environmental conditions of the tag.

8. The method for producing a pseudo-random RF signal of claim 7 wherein the monitored environmental conditions include the temperature of the tag.

9. The method for producing a pseudo-random RF signal of claim 7 wherein the monitored environmental conditions include the motion of the tag.

10. A tag for use in a radio frequency identification system comprising:
    a) at least one on-board sensor for monitoring the environmental conditions of the tag;
    b) an on-board microprocessor for receiving data from the sensor to calculate a next psuedo-random transmission time of the tag; and
    c) an on-board transmitter for transmitting a signal at the calculated psuedo-random transmit time.

11. The tag of claim 10 wherein said sensor is a temperature sensor.

12. The tag of claim 10 wherein said sensor is a motion sensor.

13. The tag of claim 10 further comprising a timing circuit in communication with said microprocessor for receiving the calculated transmit time and for initializing said transmitter at the calculated transmit time.

14. The tag of claim 10 wherein said tag includes a power source for operation of the microprocessor, sensor and transmitter of said tag.

15. The tag of claim 10 wherein said tag includes a random access memory (RAM).

16. The tag of claim 10 wherein said tag includes a non-volatile memory.

\* \* \* \* \*